March 26, 1963     B. G. LARSSON ETAL     3,082,984
WIRE BUNDLE HOLDER FOR ELECTRICAL WIRING
Filed Jan. 4, 1960     3 Sheets-Sheet 1
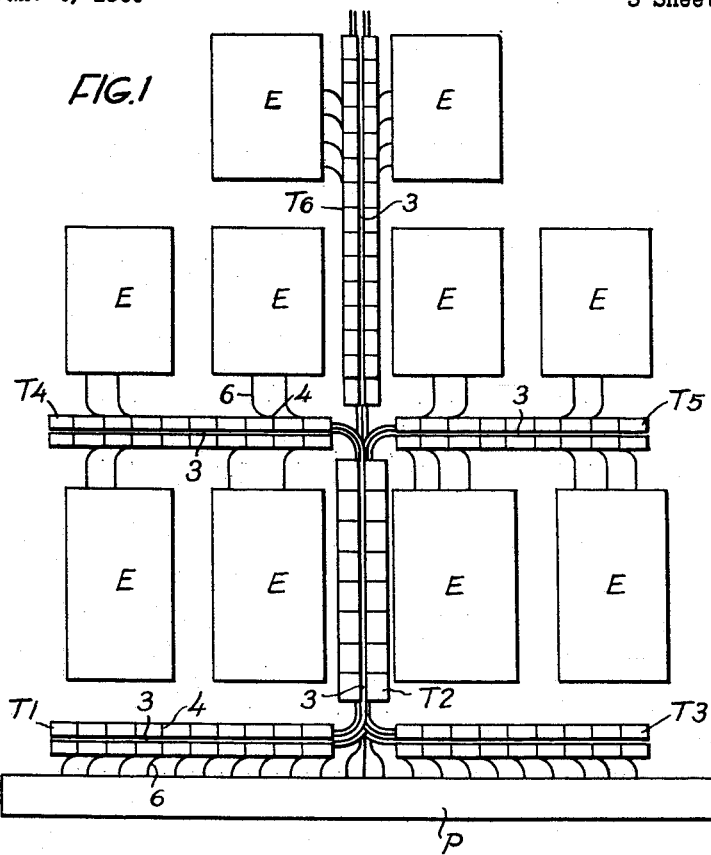
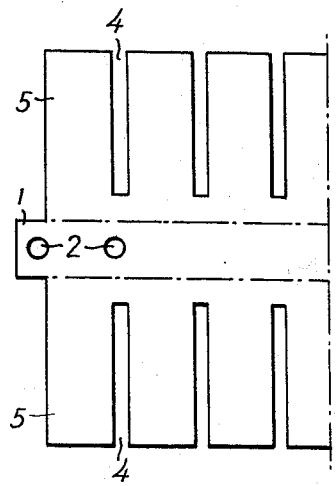
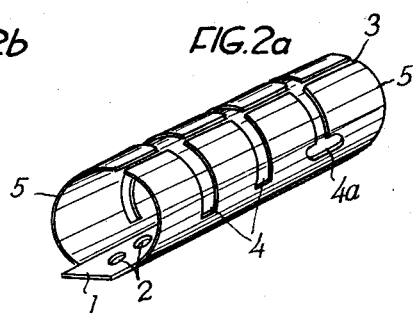
INVENTORS:
Bernt Gustav Larsson
Karl Tage Östmark
BY Pierce, Scheffler & Parker
their Attorneys

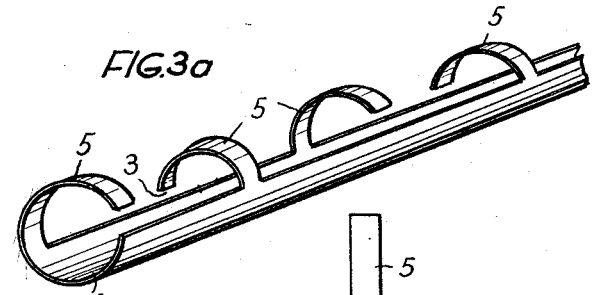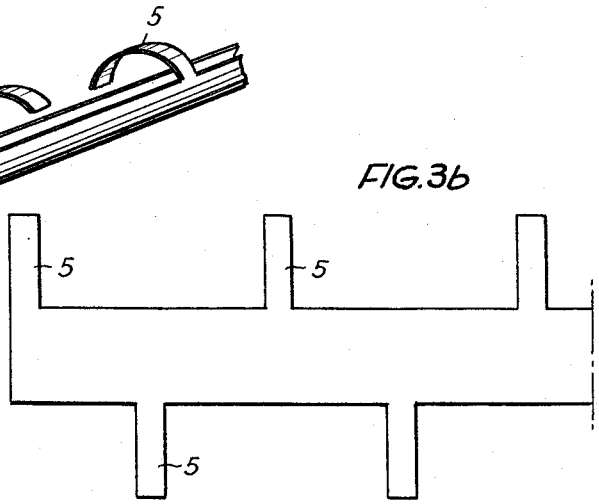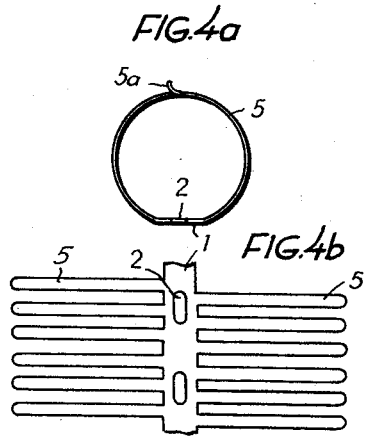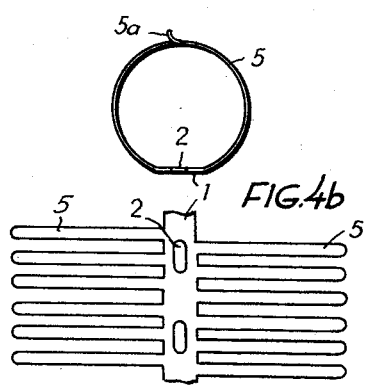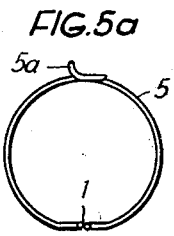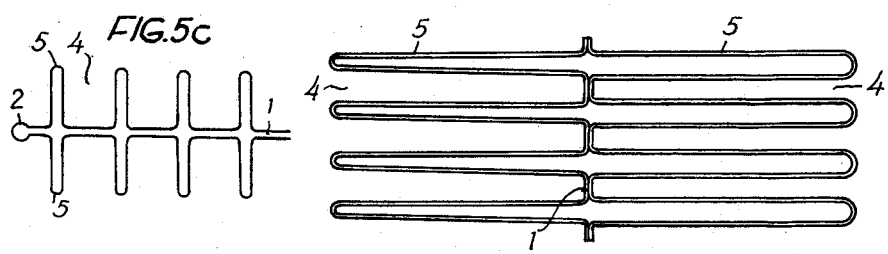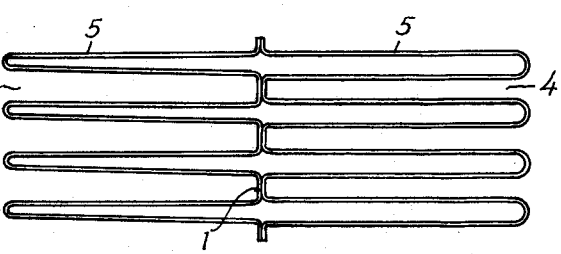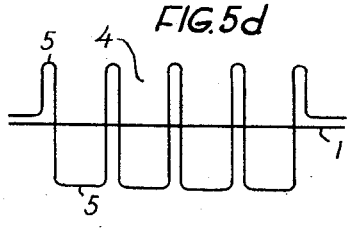

March 26, 1963  B. G. LARSSON ETAL  3,082,984
WIRE BUNDLE HOLDER FOR ELECTRICAL WIRING Filed Jan. 4, 1960  3 Sheets-Sheet 3

INVENTORS
Bernt Gustav Larsson
and
BY Karl Tage Östmark,
Pierce, Scheffler & Parker
their Attorneys – # United States Patent Office 3,082,984
Patented Mar. 26, 1963

3,082,984
WIRE BUNDLE HOLDER FOR ELECTRICAL WIRING
Bernt Gustav Larsson, Skinnskatteberg, and Karl Tage Ostmark, Riddarhyttan, Sweden, assignors to Ingenjorsfirma T. Ostmark & Co., Skinnskatteberg, Sweden, a corporation of Sweden
Filed Jan. 4, 1960, Ser. No. 3,972
3 Claims. (Cl. 248—68)

The present invention relates to means for holding bundles of insulated electrical conductors in circuit wiring such as switch boards, instrument boards, distribution boards and tables, commercial radio installations and other telecommunication equipment and electrical installations.

It is a well-known practice to bunch electrical conductors in any kind of wiring by means of tape, rope yarn or ribbons tied around the wires in the transverse direction of the wire bundle. There exist also other methods and means to bunch the wires such that the wiring of the concerned apparatus or installation is clearly arranged and easy to survey.

The invention is related with a novel type of such means which for the sake of simplicity are referred to as "wire bundle holders," or only "holders" in the following specification.

It should be noted that all means hitherto used are time consuming and normally require the connection of provisional wiring, and after bundling of the different strings of wires, each individual wire normally has to be cut to correct length and to be connected once again to the appropriate terminal. Besides, the wire bundles could not be reopened in a simple way, for example when a defective wire had to be replaced by a new one.

The principal object of the present invention is to provide wire bundle holders, which make possible bundling of insulated wires in a simple and time-saving manner.

Other objects and advantages of the invention will be apparent from the following detailed description of a number of examples taken in connection with the accompanying drawings in which:

FIG. 1 is an elevational view of an instrument board or the like, bearing a plurality of electrical devices which are interconnected and/or connected to input terminals and are bundled by wire bundle holders according to the invention.

FIGS. 2a–8b show individual wire bundle holders according to the invention, wherein FIGS. 2a and 3a are fragmentary perspective views, FIGS. 2b and 3b show a development hereof.

FIGS. 4a, 5a, 6a, 7 and 8a are sectional views whereas FIGS. 4b, 5b–5d and 8b are respective evolutions hereof.

Figure 6A:
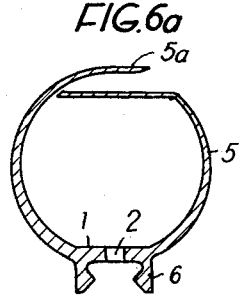

Referring first to FIG. 2a, this drawing shows part of a wire bundle holder in accordance with the invention, consisting of an elongated tubular structure of thermoplastic material such as nylon. This structure is provided with a longitudinal slot 3 and a plurality of transverse slots 4 opening into the longitudinal slot 3 such that tongues 5 remain which extend from a common flattened base 1 provided with holes 2 and being integral with the tongues 5. If desired, the structure can be mounted upon a platen or a plate or another base by means of screws, rivets, knobs or the like to be inserted in the holes 2.

FIG. 2b is an evolution of the structure shown in FIG. 2a.

FIG. 1 shows an instrument board or the like provided with a number of electrical devices E such as distribution terminal boxes, relays, measuring instruments, switches, fuse boxes etc. Besides, the board is provided with (at least) one cable terminal or connecting block P to be connected to external lines on the one side and to said devices E on the other side. In order to organize the wiring system, wire bundle holders T1—T6 such as those described above and shown in FIGS. 2a and 2b are fixed to the board, for example to the rear side of it. The required insulated conductors or wires are drawn and automatically bunched in the holders in a way which may be seen from the following example. Considering, for example, the wire which is provided with the reference numeral 6 in FIG. 1, one end of this wire 6 is connected to the appropriate terminal of the connecting block P. The wire is pressed into the most adjacent transverse slot 3 of the holder T1 and through the longitudinal slot 4 hereof gradually to the right-hand end of holder T1, so that the wire extends through the interior of the holder T1 between said slot and the right end of the holder. Then, the wire is pushed through the entire longitudinal slot 3 of holder T2, and, thus, passes through said holder without projecting through any of the transverse slots of this holder T2. Now, the wire is pushed in the same way through part of the length of the longitudinal slot 3 of the next holder T4, from the right end hereof, until the transverse slot directly provided with numeral "4" is reached. The wire is drawn through this transverse slot upwards in FIG. 1 and is cut to correct length. The insulation of the wire is removed at this cut end which, then, is connected to the appropriate terminal of that device E which is shown above the holder T4 at the right end hereof.

With some skill it will probably take less time to draw a wire in the above way than to read the preceding paragraph.

All connecting wires shown in FIG. 1 will be drawn in turn in the way described above until the wiring of the board is completed. It will be immediately seen that the wires remain in the holders T1—T6 in the form of wire bundles, and the proper wiring system which thus forms a structure is sometimes referred to as a "spider."

It should be noted that the width of the slot 3 should be less than the diameter of the thickest wire, including the insulation of the wire, to be drawn through such holder. The width of the slot may even be zero, provided that the material of the tongues is sufficiently resilient. Even the transverse slots 4 should preferably not be considerably wider than said thickness. It may be desirable, as the case may be, that the width of the transverse slots is also less than the thickest wire to be passed through such a slot. In such case and/or if it is desired to draw more than one wire through one or more of the transverse slots 4, the closed end of these slots is preferably widened, for instance in the way shown at 4a in FIG. 2a.

FIGS. 3a and 3b show another type of wire bundle holder according to the invention. This holder is preferably made of metal such as galvanized steel. The tongues 5 are widely spaced, offset and overlapped so that the slot 3 is narrow at the ends of the tongues but is very wide in the spaces between the tongues.

FIGS. 4a and 4b show a wire bundle holder similar to that shown in FIGS. 2a and 2b. This holder is made of resilient material such as nylon or another resilient plastic, steel or brass. The two series of tongues 5 at either side of the base 1 are, however, offset in the same way as in FIGS. 3a and 3b. The series at the righthand side of the base 1 as shown in the drawing, is composed of tongues which are longer than those of the other (left) series. The ends 5a of the longer tongues are curved as shown in FIG. 4a. It is obvious that the two series of tongues need not be offset but may be aligned in the same way as shown in FIGS. 2a and 2b, such that the ends 5a of the longer tongues overlie and engage the ends of the shorter tongues. The base 1 of this holder may be provided with elongated holes 2 for mounting the holder on a platen or board.

FIGS. 5a–5d show a modification of FIGS. 4a and 4b in that the holder is made of steel or brass wire bent in the form of a meander. The two series of tongues, viz. longer tongues in the right-hand series and shorter tongues in the left-hand series are substantially aligned, see FIGS. 5b and 5c, but may alternatively be offset, see FIG. 5d. The two series of tongues may be made from a single wire as shown in FIGS. 5c and 5d or from two wires, one for each series of tongues, see FIG. 5d. The wire or wire portions forming the base 1 of the holder may be fixed one to another for example by spot welding or wire rings or clamps such that the two opposite tongues 5 of each pair of tongues are mechancally interconnected (joined).

Figure 6B:
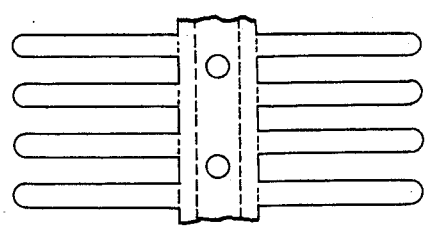

FIGS. 6a and 6b show another variation of the holder shown in FIGS. 4a and 4b wherein the ends of the tongues are radially spaced. The base 1 of the holder may be provided with an integral clamp bar 6 to be attached to a mounting rail (not shown) by dove-tail flanges of the clamp bar. The mounting rail may be fixed on a plate, board or the like and may be either a normal bar of rectangular cross-section spaced from the platen or a bar formed like a railroad rail and having, for example, an I-form. The holder is preferably made of resilient thermoplastic material such that the flanges of the clamp bar 6 are resilient. In such case the holder may be fixed to the mounting rail by mere manual pressure so that the clamp bar flanges snap over the rail.

Figure 7:
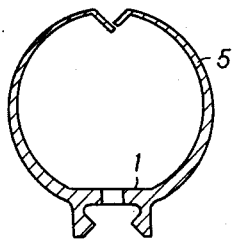

FIG. 7 shows a modification of FIG. 6a wherein, however, the ends of all tongues are bent inwards in order to facilitate insertion of electrical wires through the adjoining ends of the opposite tongues. The evolution shown in FIG. 6b applies both to FIG. 6a and FIG. 7.

Figure 8A:
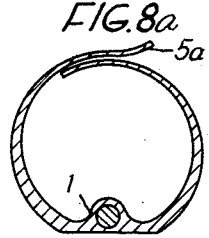
Figure 8B:
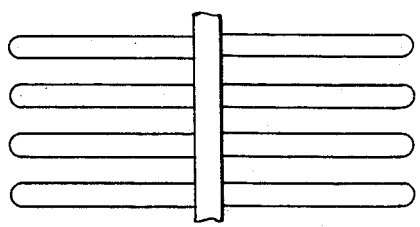

FIGS. 8a and 8b show a further modification of FIGS. 4a and 4b. The base 1 of the holder shown in FIGS. 8a and 8b has, however, a substantially circular cross-section. This holder is preferably made of plastic. The base 1 may consist of plastic or of a metal wire or metal cable embedded in plastic. This holder is particularly suitable in such cases where it should be flexible in all directions.

Figure 9:
FIG. 9 is a sectional view of a clamp for wire bundle holders.

FIG. 9 shows a clamp made of metal or, preferably, of plastic. This clamp may be attached to all holders of the general shape of FIGS. 2a–7 not provided with integral clamping means. The head 7 can be inserted by pressure through the holes 2 in the base of a holder provided said either said base or said head, or both, are made of resilient plastic. For this purpose the holes 2 may be tapered such that the opening facing the clamp shown in FIG. 9 is wider than the opening at the inside of the holder.

In any of the holders described above, the two series of tongues may be either aligned or offset, that is, the tongues of each pair of opposite tongues are aligned or offset respectively. In practical use, there will be a considerable difference between these two types of holders. If the longitudinal slot 3 is very narrow or zero and, particularly, if besides the ends of opposite tongues are overlapping, the wires to be bundled have to be inserted through the slot 3 in a zigzag-like manner which may involve a slight waste of time but, on the other side, the wires are bundled more firmly and there is little danger that a wire may be pulled out through the longitudinal slot of the holder by accident. Thus, overlapping tongues may be preferable, as the case may be, in such cases where the width of slot 3 is zero or at least very narrow and if at the same time the holder is made from a relatively stiff material such as stiff thermoplastic material or metal. Of course, the stiffness is depending both on the type of material and on the thickness, length and form of the tongues. This involves, that the stiffness is also depending on the cross-sectional area of the wire bundle holder. Normally, aligned tongues are preferred. If offset tongues are used and if the structure is such that the wire has to be inserted in a zigzag-like manner, the spacing of the tongues or, in other words, the number of tongues per length unit of the holder should be as small as possible but never less than three tongues for the entire holder (two tongues on one side hereof and one tongue on the other side). It is preferred, however, that the spacing of the tongues is such that the shortest holder to be used comprises at least four or five tongues altogether.

With a wire bundle holder of the general form shown in FIG. 2a, insertion of wires into the holder will be about equally easy as removing wires from the holder. In normal use, removal of wires from the holder (for example to exchanged damaged wires) will be necessary only in exceptional cases. Thus, it is preferred to shape the holder such that it facilitates insertion of wires and firmly holds the wires and protects them against mechanical damage, even if such shape permits the wires to be removed only with some difficulty. Wire bundle holders of the types shown in FIGS. 4a–8a obviously meet these requirements particularly if the tongues of each pair of tongues are aligned (not offset).

If such wire holders are required to have a substantial diameter, exceeding about 3", in order to take hold of a considerable number of wires or for a number of thick wires, such holders may preferably be made of metal. Particularly in this case, but also in other cases, the holder may have the general shape shown in FIGS. 2a and 2b but preferably with all tongue ends bent upwards as shown at 5a in FIGS. 4a and 4b or inwards as shown in FIG. 7 though with some open space (gap) between opposite tongue ends.

If the holders should be flexible to some extent at least laterally or even in all directions normal to the base 1, they should be made of plastic or metal wire having a narrow base as shown in FIGS. 4a, 4b, 5a–5d, 8a, or 8b and no integral flanges 6 should be provided in such case. Besides the ratio of the width of the transverse slots and tongues should be sufficiently high, preferably more than unity.

Above, the spacing of the tongues and the width and form of the transverse slots 4 have been mentioned. As the spacing (centre distance) between terminals of most electric devices is standardized, the centre distance of adjacent transverse slots 4 should be adapted hereto as far as possible. Requirements of this type are not stringent because, as may be seen from FIG. 1, the wires passed through the transverse slots need not necessarily been drawn in a straight manner the shortest way to the appropriate terminal and even more than one wire may be drawn through a transverse slot.

Wire bundle holders are normally required to be fixed to a base plate or the like or to a bar. Some mounting means have already been described above. However, also clips and clamps of well-known type may be used. If the wire bundle holder is made of a resilient material such as plastic, it may suffice to provide the base plate with small knobs or with screw or rivet heads slightly spaced from the plate so that the holder may be fixed by pressure, that is, so that said knobs etc. penetrate the holes 2 of the holder. The holes 2 may be tapered to facilitate the penetration of the knobs. Of course, these knobs etc. need not be made of metal but may be of plastic.

It should be noted that wire bundle holders made in accordance with the invention may be used without being fixed to a plate or another base. In many cases, wire bundles should be flexible, such as wire bundles connecting a movable apparatus, for example a hinged instrument board, to a stationary terminal or connecting block.

The wire bundle holders thus may replace helical stiffening wires, bandages, flexible tubes etc. hitherto used for this purpose.

Particularly when using wire bundle holders having open gaps between opposite tongue ends as shown in FIG. 1, a strip of board, plastic, vulcanized fibre or the like may be inserted between the gaps and the wires within the holder such that this strip extends substantially along the entire length of the holder. However, holders provided with tongues as shown in any of the FIGS. 4–8 are quite satisfactory even without such strips and are preferred for this and other reasons.

It is characteristic for any wire bundle holder according to the invention that the longitudinal slot 3 extends along the whole length of the holder and is open-ended at both ends. Furthermore, all transverse slots 4 to be used for any wire, which extends through the holder and through such slot 4, are open-ended into the longitudinal slot 3 and have a closed opposite end. Such transverse slots extend from the top of the holder, that is from a point opposite to base 1, down to a closed-end point in the vicinity of or below a plane (horizontal central plane in the drawings) intersecting the wire bundle holder in those points on the periphery which lie midways, along the periphery, between the top of the holder and the longitudinal edges or borders of the base 1. Thus, if the periphery of the holder is completely circular and if the holder is cylindrical, said plane contains the centre line of the holder and is parallel to the plate etc. upon which the holder is to be fixed, and subdivides the holder into two semi-cylinders.

Finally, the methods of production of wire bundle holders may be mentioned. Metallic holders can be made from sheet metal by cutting or punching blankets having the form of the evolution of the holder, see FIG. 4b. Considering, for example, the holder shown in FIGS. 4a and 4b it is obviously possible to cut, punch or stamp a number of holders such that the tongues and transverse slots of separate adjacent holders are interlaced during the stamping operation so that waste of sheet metal can be reduced to a minimum. The stampings may then be bent around a mandrel or bent by a press brake to form the holders shown in FIG. 4a. The same applies, of course, also to similar holders provided with tongues of the type shown in FIGS. 3a, 3b, 6a–8b. If the holders are made from plastic material, the method just described is less suitable because the inherent properties of the known thermoplastic materials would cause a more or less marked tendency for the tongues to regain their straight form so that the longitudinal gap 4 tends to be wider in the course of time. Thus, plastic holders should be given their eventual shape by one pressing or other forming process. Also known special types of production by extrusion in connection with a continuously forming device (continuously moving profiled pressing wheel or chain) can be used.

Both with regard to production and to flexibility of the holders it may be advantageous to compose the holders from a separate strip of metal or plastic forming the base 1 of the holder, and to provide this strip with prefabricated tongues which are fixed to strip by any known method such as spotwelding or by means of adhesive, clips, rivets or the like.

Wire bundle holders may be produced in substantial lengths and cut into pieces of suitable length, either by the producer hereof or by the user of such holders.

What we claim is:

1. In combination a bundle of wires and a holder thereon, said holder comprising a flexible base portion extending longitudinally of said bundle of wires and a plurality of longitudinally spaced resilient fingers integral with and extending from each side of said base portion around said bundle of wires and defining with said base portion a tubular configuration, each of said fingers consisting of resilient thermoplastic material, the free ends of all fingers secured to each side of said base portion being alined with each other in lines parallel to the longitudinal axis of said holder and the free end of each finger secured to one side of said base portion overlapping the free end of a finger secured to the other side of said base portion in the radial direction and the free ends of the fingers secured to one side of the base being closer to the free ends of the fingers secured to the other side of the base than the diameter of the wires of said bundle to prevent the escape of wires from said bundle.

2. The combination as defined in claim 1 comprising resilient clamping means integral with said base.

3. The combination as defined in claim 1 in which the radial thickness of each finger decreases in the direction from said base portion to its free end.

References Cited in the file of this patent

UNITED STATES PATENTS

| 1,238,410 | Landsberg | Aug. 28, 1917 |
| 1,790,666 | Huff | Feb. 3, 1931 |
| 1,794,102 | Comins | Feb. 24, 1931 |
| 2,082,099 | Cruser | June 1, 1937 |
| 2,089,018 | Catini | Aug. 3, 1937 |
| 2,108,347 | Quarnstrom | Feb. 15, 1938 |
| 2,653,990 | Brant | Sept. 29, 1953 |
| 2,809,004 | Kaufman et al. | Oct. 8, 1957 |
| 2,896,009 | Caveney | July 21, 1959 |

FOREIGN PATENTS

| 17,683 | Great Britain | Aug. 2, 1907 |
| 398,146 | Great Britain | of 1933 |
| 871,021 | Germany | Mar. 19, 1953 |
| 1,145,892 | France | May 13, 1957 |